Jan. 19, 1932.  A. HAUGE  1,841,729
LOADING MACHINE
Filed Nov. 14, 1927
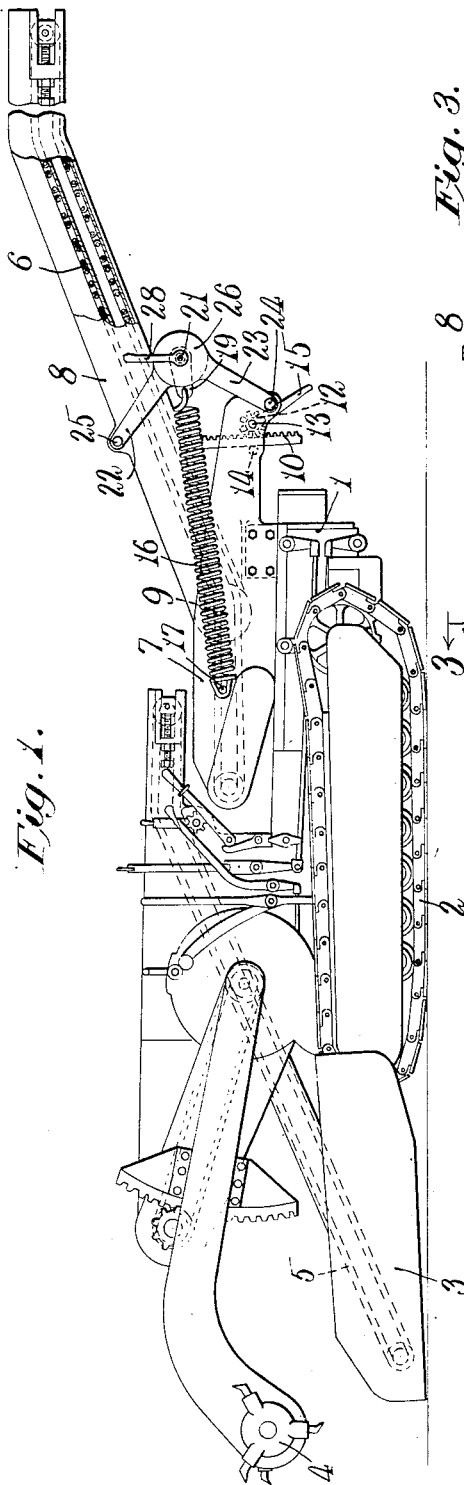
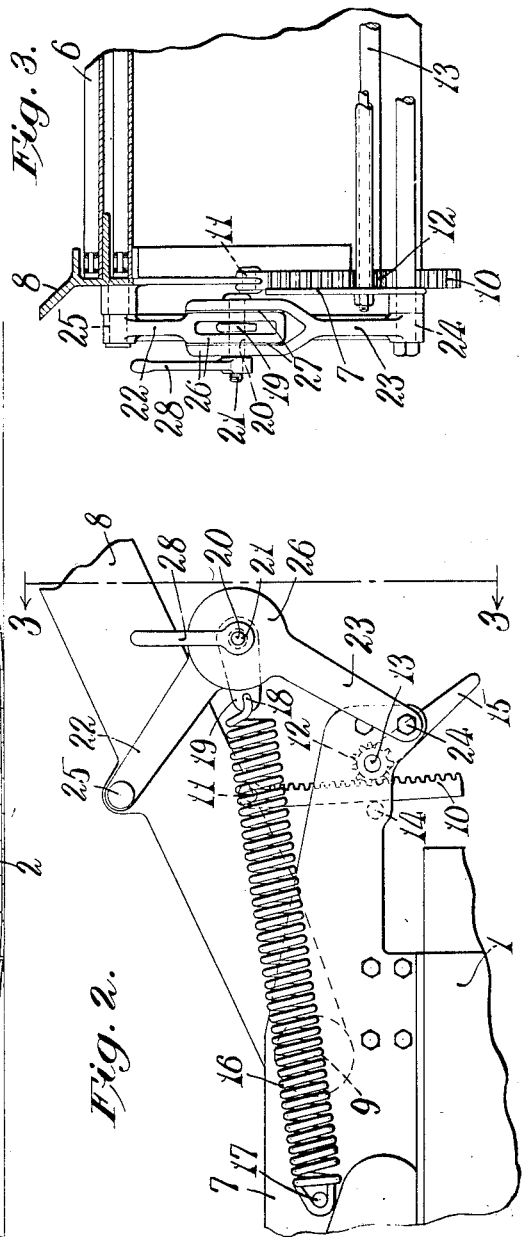
Inventor:
Andrew Hauge
by Louis A. Maxson Patented Jan. 19, 1932

1,841,729

UNITED STATES PATENT OFFICE

ANDREW HAUGE, OF MICHIGAN CITY, INDIANA, ASSIGNOR TO SULLIVAN MACHINERY COMPANY, A CORPORATION OF MASSACHUSETTS

LOADING MACHINE

Application filed November 14, 1927. Serial No. 233,231.

This invention relates to loading machines and more particularly to machines for loading loose coal or other similar materials in mines.

An object of this invention is to provide an improved loading machine. Another object is to provide a coal loading machine having a conveyor pivotally mounted for tilting up and down, with which is combined mechanism for tilting the conveyor in cooperation with a take up device for supporting the greater portion of the weight of the conveyor. Still another object is to provide improved means for adjusting the tail or loading conveyor of a loading machine; and as I desire this adjusting means to be manually operable, a further object is to provide cooperating take up mechanism for supporting the bulk of the weight of the conveyor, thereby facilitating manual adjustment thereof. A more specific object of my invention is to provide take up mechanism for supporting substantially the whole weight of the tail or loading conveyor of a loading machine throughout the range of its adjustment. These and other objects and advantages of this invention will, however, subsequently more fully appear.

In the accompanying drawings there is shown for purposes of illustration one form which the invention may assume in practice.

In these drawings,—

Fig. 1 is a side elevational view of a loading machine equipped with my improved mechanism, parts being broken away to illustrate details of construction.

Fig. 2 is an enlarged fragmentary view in elevation illustrating the improved swinging and counterbalancing means for the tail conveyor.

Fig. 3 is a detail view partially shown in section taken substantially on line 3—3 of Fig. 2.

In this illustrative embodiment of the invention there is shown a coal loading machine of the same general type as that described in a copending application of one Frank A. Halleck, Ser. No. 160,486, filed Jan. 11, 1927. The machine generally comprises a frame 1 mounted on and propelled by endless traction treads 2. Pivotally mounted on the frame 1 for vertical swinging movement relative thereto is a shovel 3; while cooperating with the shovel and also pivotally mounted on the frame 1 is a toothed roller 4, this roller being adapted to move the coal downwardly and rearwardly onto the shovel 3 from which it is conveyed by an endless front gathering conveyor 5 rearwardly lengthwise of the machine. The front conveyor 5 discharges on to a rear loading or tail conveyor 6 mounted for lateral swinging movement on the frame 1 in a manner clearly described in the copending application mentioned above. This tail conveyor includes a frame portion 7 which is pivoted for horizontal swinging but not for vertical swinging, and a vertically tiltable frame portion 8, the frame portion 8 being pivoted on the frame portion 7 at 9.

The improved mechanism for vertically swinging the frame portion 8 of the tail conveyor relative to the frame portion 7 comprises a toothed rack 10 pivotally connected at 11 to the frame portion 8. Meshing with this rack is a pinion 12 suitably fixed to a horizontal shaft 13 rotatably mounted on the rigid frame portion 7. The rack 10 is guided and held in meshing engagement with the pinion by a roller 14 secured to the frame 7, this roller being located at the opposite side of the rack from the pinion 12. The shaft 13 has suitably fixed thereto at its outer end an operating crank or lever 15. Cooperating with the improved swinging mechanism described above are improved means for substantially counterbalancing the tail conveyor 6 throughout its range of movement, these counterbalancing means relieving the load on the swinging means in such a manner to facilitate manual operation thereof. These improved counterbalancing means are arranged on both sides of the tail conveyor; and as these means are identical, description of one will suffice for both. The counterbalancing means comprises a coiled spring 16 connected at one end at 17 to the frame portion 7 of the tail conveyor and at its opposite end at 18 to a link 19. This link is pivotally connected at 20 to a horizontal clamping bolt 21, this bolt forming the pivot between the adjacent ends of a pair of toggle links or arms 22 and 23. The remote ends of the links 23 and 22 are pivotally connected at 24 and 25 to the frame portions 7 and 8 respectively. As clearly shown in Fig. 2 the adjacent ends of the toggle links 22 and 23 have formed thereon disc-shaped portions 26 between which are interposed friction washers or plates 27. Extending through the portions 26 and washers 27 is the bolt 21, the bolt 21 having threadedly connected thereto a lever 28 by means of which the disc-shaped portions 26 of the toggle links may be clamped together to yieldably lock the frame portions 7 and 8 against relative movement.

In the use of the improved mechanism, when it is desired to vary the elevation of tiltable portion 8 of the tail conveyor, the operator grasps the lever 15 and rotates the pinion 12, thereby causing the rack 10 together with the frame portion 8 to be raised or lowered as desired. During this raising and lowering operation the springs 16 and the cooperating toggle links 22 and 23 maintain the frame portion 8 in a substantially balanced condition. As the frame portion 8 is swung downwardly from the position shown in Fig. 1, the tension of the springs 16 increases and at the same time the angle between the toggle links 22 and 23 decreases. It is obvious that when the links 22 and 23 are nearly in alinement, a very slight pull by the spring 16 will support a relatively heavy weight, whereas the further the links swing away from alinement, the greater must be the pull by the spring 16 in order to support the same weight. As a result a substantially constant upward force is transmitted to the frame portion 8 at all times, thereby maintaining this frame portion in a substantially counter-balanced condition throughout its range of tilting movement and as a further result, manual adjustment of the rack and pinion for swinging the conveyor is facilitated. When it is desired to yieldably lock the tiltable portion 8 to the frame portion 7, the operator merely tightens the clamping bolt 21, thereby yieldably locking the toggle links 22 and 23 together. It will be noted, however, that upon overload of the tail conveyor, this friction lock is adapted to slip, thereby to prevent undue strain and resultant breakage of the conveyor. These and other uses and advantages of the invention will be clearly apparent to those skilled in this art.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a loading machine, a support, conveying means thereon including a tiltable conveyor portion, and counterbalancing means for imparting a substantially equal counterbalancing force to said conveyor portion throughout its range of tilting movement, and means engaging elements of said counterbalancing means for yieldably holding said conveyor portion against tilting movement relative to said support.

2. In a loading machine, a support, a conveying means including a conveyor portion pivotally mounted thereon and means for maintaining said conveyor portion in a substantially counterbalanced condition throughout its range of swinging movement including a toggle between said support and conveyor portion and resilient means acting on said toggle, and means for clamping the elements of said toggle together to hold said conveyor portion against movement relative to said support.

3. In a loading machine providing a support, conveying means pivotally mounted on the support for tilting up and down through a predetermined range, means for opposing the downward movement of said conveying means and substantially counterbalancing the latter throughout its range of tilting movement, and means for frictionally and yieldably holding said conveying means against movement relative to said support.

4. In a loading machine providing a support, conveying means pivotally mounted on the support for tilting up and down through a predetermined range, and means for opposing the downward movement of said conveying means and substantially counterbalancing the latter throughout its range of tilting movement including a toggle extending between said support and said conveying means, resilient means acting on said toggle and tending to straighten the same, and manually operable rack and pinion mechanism for swinging said conveying means relative to said support.

5. In a loading machine providing a support, conveying means pivotally mounted on the support for tilting up and down, and means for opposing the downward movement of said conveying means including a toggle between said support and said conveying means and resilient means acting on said toggle and tending to straighten the same, and clamping means for holding the elements of said toggle against relative movement.

6. In a loading machine providing a support, conveying means pivotally mounted on the support for tilting up and down, and means for opposing the downward movement of said conveying means including a toggle between said support and said conveying means and resilient means acting on said toggle and tending to straighten the same, and clamping means for frictionally and yieldably holding the elements of said toggle against relative movement.

7. In a loading machine providing a support, conveying means pivotally mounted on the support for tilting up and down, means for tilting said conveying means up and down relative to said support through a predetermined range, means for opposing the downward movement of said conveying means and substantially counterbalancing the latter throughout its range of tilting movement including relatively movable members, and means cooperating with relatively movable members of said counterbalancing means for frictionally and yieldably holding the same against relative movement to maintain said conveying means against tilting movement.

8. In a loading machine providing a support, conveying means pivotally mounted on the support for tilting up and down, means for tilting said conveying means up and down relative to said support through a predetermined range, means for opposing the downward movement of said conveying means and substantially counterbalancing the latter throughout its range of tilting movement including pivotally connected links, and means cooperating with the pivotal connection between said links for frictionally and yieldably holding the same against relative angular movement to maintain said conveying means against tilting movement.

9. In a loading machine providing a support, conveying means pivotaly mounted on the support for tilting up and down, means for opposing the downward movement of said conveying means including toggle links, and means for yieldably holding adjacent portions of said links against relative angular movement.

In testimony whereof I affix my signature.

ANDREW HAUGE.